(12) United States Patent
Chen

(10) Patent No.: US 10,367,358 B2
(45) Date of Patent: Jul. 30, 2019

(54) ACTIVE EQUALIZING CHARGING DEVICE

(71) Applicant: Fu-Chieh Chen, Taichung (TW)

(72) Inventor: Fu-Chieh Chen, Taichung (TW)

( * ) Notice: Subject to any disclaimer, the term of this patent is extended or adjusted under 35 U.S.C. 154(b) by 16 days.

(21) Appl. No.: 15/860,677

(22) Filed: Jan. 3, 2018

(65) Prior Publication Data

US 2019/0207396 A1    Jul. 4, 2019

(51) Int. Cl.
*H02J 7/00* (2006.01)

(52) U.S. Cl.
CPC .......... *H02J 7/0019* (2013.01); *H02J 7/0021* (2013.01)

(58) Field of Classification Search
CPC .... G01R 31/3658; Y02E 60/12; H02J 7/0021; H02J 7/0022; H02J 7/0024; H02J 7/0019
USPC ......................................................... 320/121
See application file for complete search history.

(56) References Cited

U.S. PATENT DOCUMENTS

| | | | | |
|---|---|---|---|---|
| 8,212,522 B2* | 7/2012 | Deal | ...................... | H01M 2/204 320/107 |
| 8,342,103 B2* | 1/2013 | Barbee | ...................... | B61C 3/02 105/50 |
| 2010/0090662 A1 | 4/2010 | Okuto | | |
| 2013/0069594 A1 | 3/2013 | Jung | | |
| 2013/0214739 A1* | 8/2013 | Lee | ...................... | H02J 7/0016 320/118 |
| 2013/0214741 A1* | 8/2013 | Lee | ...................... | H02J 7/0016 320/134 |
| 2014/0089692 A1 | 3/2014 | Hanafusa | | |
| 2014/0340023 A1* | 11/2014 | Shu | ...................... | H02J 7/0018 320/107 |
| 2015/0256002 A1* | 9/2015 | Yonetani | ...................... | H02J 3/32 320/150 |
| 2016/0181837 A1* | 6/2016 | Shu | ...................... | H02J 7/0016 320/119 |

FOREIGN PATENT DOCUMENTS

| | | |
|---|---|---|
| JP | 2003157908 A | 5/2003 |
| TW | I337412 | 2/2011 |
| TW | M518824 | 3/2016 |
| WO | WO2008137764 A1 | 11/2008 |

* cited by examiner

*Primary Examiner* — Arun C Williams

(57) ABSTRACT

The present invention provides an active equalizing charging device and a method using the charging device to charge a secondary battery. The secondary battery consists of a storage battery unit, which includes a plurality of battery modules connected in series. The active equalizing charging device consists of a control unit, a charging unit, a voltage detection unit, and a temperature detection unit. The control unit is coupled to and used to control the charging unit. The voltage detection unit is used to detect the voltage of each of the battery modules. The temperature detection unit is used to detect the temperature of the storage battery unit. The charging unit consists of one first battery charger, one first switch, a plurality of second battery chargers, and a plurality of second switches. The first switch is used to close or open the circuit between the first battery charger and the storage battery unit. Each of the second battery chargers is respectively coupled to one of the battery modules and the power source, and each of the battery modules is respectively coupled to one of the second battery chargers. Each of the second switches are used to close or open the circuit between each of the second battery chargers and the battery modules.

3 Claims, 4 Drawing Sheets

ACTIVE EQUALIZING CHARGING DEVICE

BACKGROUND OF THE INVENTION

(a) Field of the Invention

The present invention relates to a secondary battery charging device, and more particularly to an active equalizing charging device and a method for charging a secondary battery using the described charging device.

(b) Description of the Prior Art

A secondary battery is a battery that can be repeatedly charged and discharged, a large number of secondary batteries are used as a power source in various types of mobile equipment (such as automobiles, motor cycles, mobile phones, and the like). However, the different power requirements of the various types of mobile equipment requires secondary batteries with various different specifications (such as charge capacity, voltage, and the like). A secondary battery primarily comprises a storage battery unit and a control circuit. The storage battery unit primarily comprises a plurality of strings of battery cells constructed from battery cells connected in series, with each of the string of battery cells further connected in series. The storage battery unit is used to store electric power, and the control circuit is an electronic circuit. The control circuit is electrically connected to the storage battery unit, and the storage battery unit uses the control circuit to electrically connect to an external electric equipment or a charging device, thereby enabling charging/discharging of the storage battery unit.

Equalized charging of each of the string of battery cells is necessary when charging the secondary battery to prevent overcharging of the battery cells of a single string of battery cells, which would otherwise affect the serviceable life of the battery cells and safety when charging. Charging devices of the prior art adopt a consume power method or a suspend charging method to achieve the object of equalized charging of each of the strings of battery cells, wherein the consume power method primarily uses a dissipative equalizing circuit to cause consumption of the electric power of a string of battery cells when the voltage reaches a preset saturation voltage. The suspend charging method uses a circuit design that suspends charging of a string of battery cells when the voltage reaches a preset saturation voltage Taiwan Patent Nos. 1483507 and 1502849 disclose two different circuit designs for a charging device and charging method, with both the patents respectively disclosing a charging device and a charging method that adopts a suspend charging method to achieve equalized charging.

SUMMARY OF THE INVENTION

The main object of the present invention lies in providing an active equalizing charging device and method for charging a secondary battery using the described charging device whereby original circuits are used to enable equalized charging of a plurality of battery modules of the secondary battery.

The present invention relates to An active equalizing charging device, used to charge a secondary battery, the secondary battery comprises a storage battery unit, and the storage battery unit comprises a plurality of battery modules connected in series; the active equalizing charging device comprises a control unit, a charging unit, a voltage detection unit, and a temperature detection unit, wherein the control unit is constructed from an electronic circuit, the control unit is coupled to the charging unit, and the control unit is used to control the charging unit, the voltage detection unit and the control unit are coupled to each of the battery modules, the voltage detection unit is a voltage detection circuit, and the voltage detection unit is used to detect the voltage of each of the battery modules, the temperature detection unit is coupled to the control unit, the temperature detection unit is a temperature detection circuit, and the temperature detection unit is used to detect the temperature of the storage battery unit; the charging unit comprises one first battery charger, one first switch, a plurality of second battery chargers, and a plurality of second switches, wherein the first battery charger and the storage battery unit are coupled to an external power source, and first battery charger is used to charge each of the battery modules, the first switch and the first battery charger are coupled to the storage battery unit, and the first switch is used to close or open the circuit between the first battery charger and the storage battery unit, the control unit controls the first switch, the number of the second battery chargers and the second switches matches the number of the battery modules, each of the second battery chargers is respectively coupled to one of the battery modules and the power source, and each of the battery modules is respectively coupled to one of the second battery chargers, each of the second switches is respectively coupled to one of the second battery chargers and one of the battery modules, and the second switches are used to close or open the circuit between each of the second battery chargers and the battery modules, the control unit controls each of the second switches; if the charging voltage output of the first battery charger is V1, the charging voltage output of the second battery chargers is V2, and the number of the second battery chargers is n, then $V1 > n \times V2$.

Preferably, the control unit is connected to a wireless communication unit, the wireless communication unit is used to transmit voltages and temperature value of the storage battery unit of the secondary battery to a cloud management system.

The present invention relates to a method using the active equalizing charging device of the present invention to charge a secondary battery, comprising the following steps:

collecting battery information: the voltage detection unit detects the voltage of each of the battery modules, the temperature detection unit detects the temperature of the storage battery unit, and the control unit controls the charging unit based on the voltages and temperature information detected by the voltage detection unit and the temperature detection unit;

pre-equalization charging: if the voltage of at least one of the battery modules is below the average voltage value, then the first switch remains in an off-state, and an open circuit between the first battery charger and the storage battery unit is formed, whereupon the second switch coupled to the battery module with the voltage below the average voltage value is activated to form a closed circuit state, and the other second switches remain in an off-state, accordingly, the charging unit only charges the battery module with the voltage below the average voltage value, pre-equalization charging stops when the voltage of each of the battery modules equals or is above the average voltage value; the average voltage value is determined by the internal resistance value of the battery modules;

collective charging: if the voltage of each of the battery module equals or is above the average voltage value, then each of the second switches remains in an off-state, and the first switch is activated to form a closed circuit state, forming a closed circuit between the first battery charger and the storage battery unit, enabling the first battery charger to charge each of the battery modules, collective charging stops when the voltage of at least one the battery modules is equal to the saturation voltage value;

post-equalization charging: if the voltage of at least one of the battery modules is equal to the saturation voltage value, then the first switch is cut off, and an open circuit between the first battery charger and the storage battery unit is formed, whereupon the second switches coupled to the battery modules with a voltage equal to the saturation voltage value are cut off, and the second switches coupled to the battery modules with a voltage below the saturation voltage value are activated to form closed circuit states, accordingly, the charging unit only charges the battery modules with a voltage below the saturation voltage value; when the voltage of each of the battery modules is equal to the saturation voltage value, then each of the second switches is cut off, thereby completing the charging of the secondary battery;

excessive heating protection: when the temperature of the storage battery unit is equal to or greater than a preset safe temperature, then the first switch and the second switches all remain in a cut-off state, thus suspending charging of the storage battery unit;

only the first battery charger or each of the second battery chargers charges each of the battery modules at the same time.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
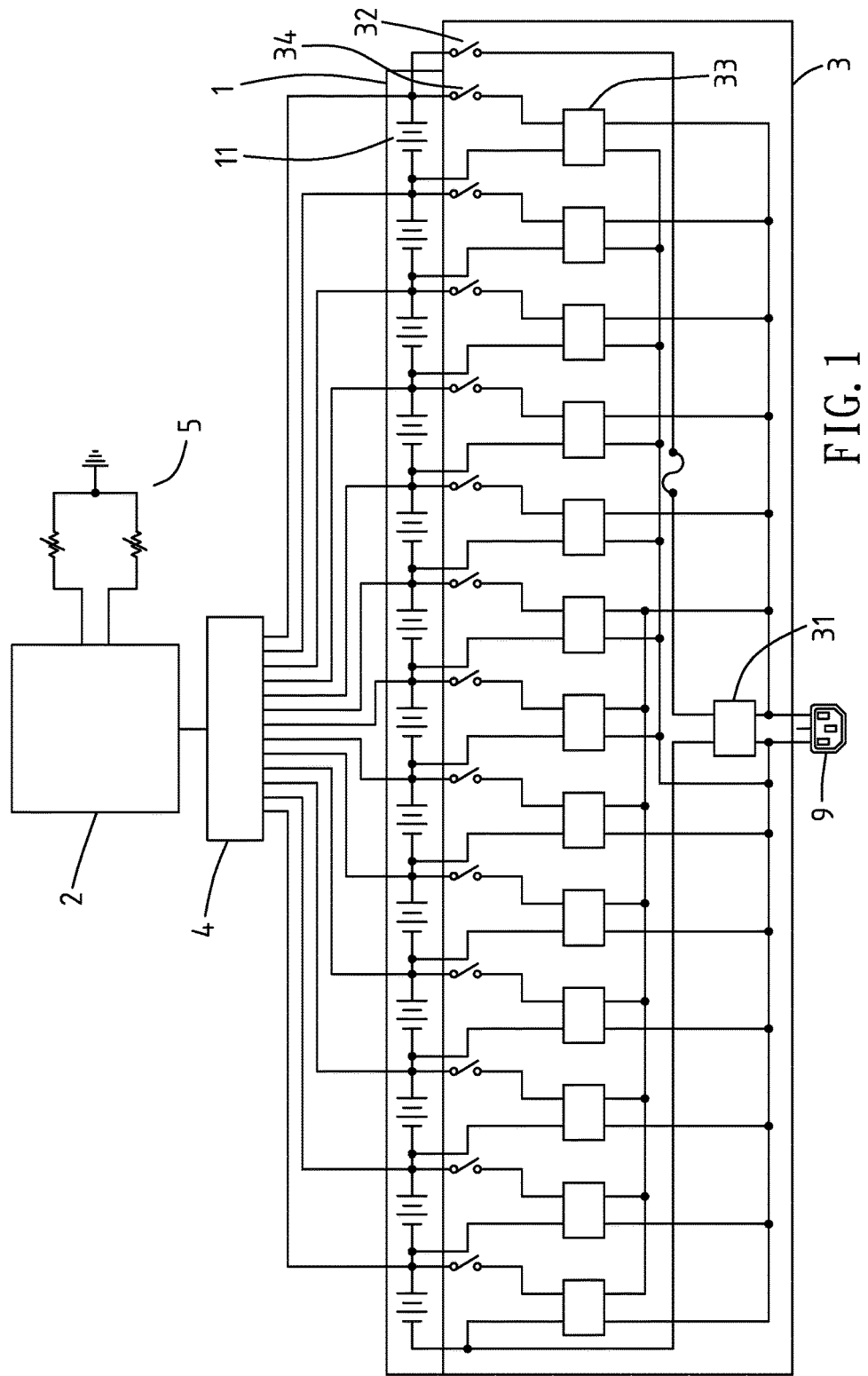
FIG. 1 is a circuit block diagram of a first embodiment of an active equalizing charging device of the present invention.

Referring to FIG. 1, which shows a circuit block diagram of a first embodiment of an active equalizing charging device of the present invention and depicts the coupling configuration of the active equalizing charging device to a storage battery unit 1 of a secondary battery. The storage battery unit 1 comprises a plurality of battery modules 11 connected in series. The battery modules 11 are assembled from a plurality of battery cells connected in series; the battery modules 11 can also be a single battery cell.

The active equalizing charging device of the present invention comprises a control unit 2, a charging unit 3, a voltage detection unit 4, and a temperature detection unit 5.

The control unit 2 is constructed from an electronic circuit, with the control unit 2 coupled to the charging unit 3 and used to control the charging unit 3. The voltage detection unit 4 and the control unit 2 are coupled to each of the battery modules 11, and the voltage detection unit 4 is a voltage detection circuit used to detect the voltage of each of the battery modules 11, which serves as basis to enable the control unit 2 to control the charging unit 3. The temperature detection unit 5 is coupled to the control unit 2; the temperature detection unit 5 is a temperature detection circuit, and is used to detect the temperature of the storage battery unit 1, which serves as basis to enable the control unit 2 to control the charging unit 3.

The charging unit 3 comprises a first battery charger 31, a first switch 32, a plurality of second battery chargers 33, and a plurality of second switches 34. The first battery charger 31 and the storage battery unit 1 are coupled to an external power source 9, and the first battery charger 31 is used to charge each of the battery modules 11. The power source 9 may be a generator or a mains power supply able to supply electric power. The first switch 32 and the first battery charger 31 are coupled to the storage battery unit 1, and the first switch 32 is used to close or open the circuit between the first battery charger 31 and the storage battery unit 1. In addition, the control unit 2 controls the first switch 32. The number of the second battery chargers 33 and the second switches 34 matches the number of the battery modules 11. Each of the second battery chargers 33 is respectively coupled to one of the battery modules 11 and the power source 9, and each of the battery modules 11 is respectively coupled to one of the second battery chargers 33, thereby enabling each of the second battery chargers 33 to respectively charge each of the battery modules 11. Each of the second switches 34 is respectively coupled to one of the second battery chargers 33 and one of the battery modules 11, and the second switches 34 are used to close or open the circuit between each of the second battery chargers 33 and the battery modules 11. Moreover, the control unit 2 controls each of the second switches 34. If the charging voltage output of the first battery charger 31 is V1, the charging voltage output of the second battery chargers 33 is V2, and the number of the second battery chargers 33 is n, then V1>n×V2.

Figure 2:
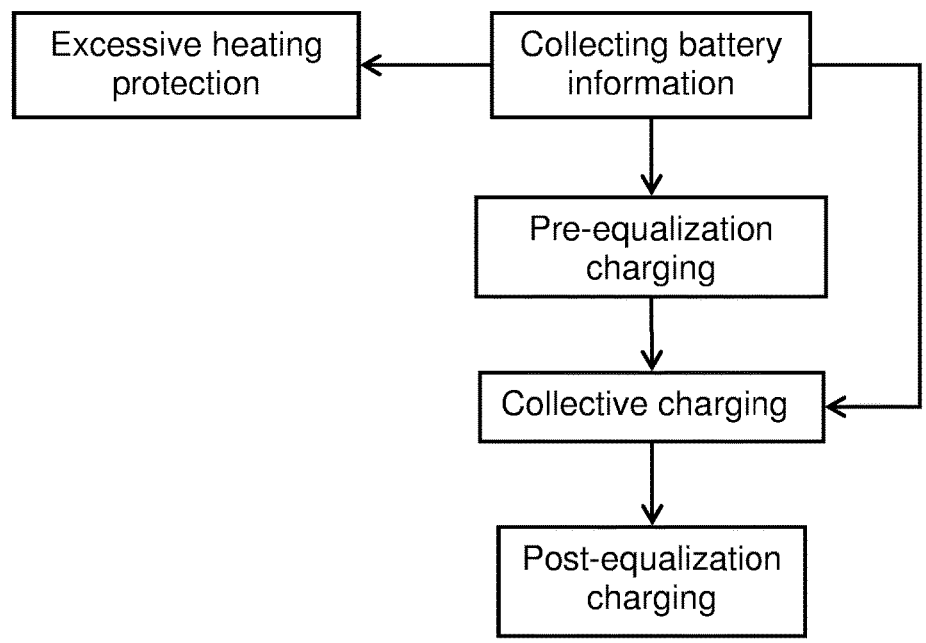
FIG. 2 is a flow diagram depicting the method of the first embodiment of the active equalizing charging device for charging a secondary battery according to the present invention.

When the aforementioned first embodiment of the active equalizing charging device is used to charge a secondary battery, the active equalizing charging device is first coupled to the external power source 9, whereupon the active equalizing charging device can be used to charge a secondary battery, Referring to FIG. 2, which shows the method using the aforementioned first embodiment of the active equalizing charging device to charge a secondary battery, comprising the following steps:

Collecting battery information: The voltage detection unit 4 detects the voltage of each of the battery modules 11, the temperature detection unit 5 detects the temperature of the storage battery unit 1, and the control unit 2 controls the charging unit 3 based on the voltage and temperature information detected by the voltage detection unit 4 and the temperature detection unit 5.

Figure 3:
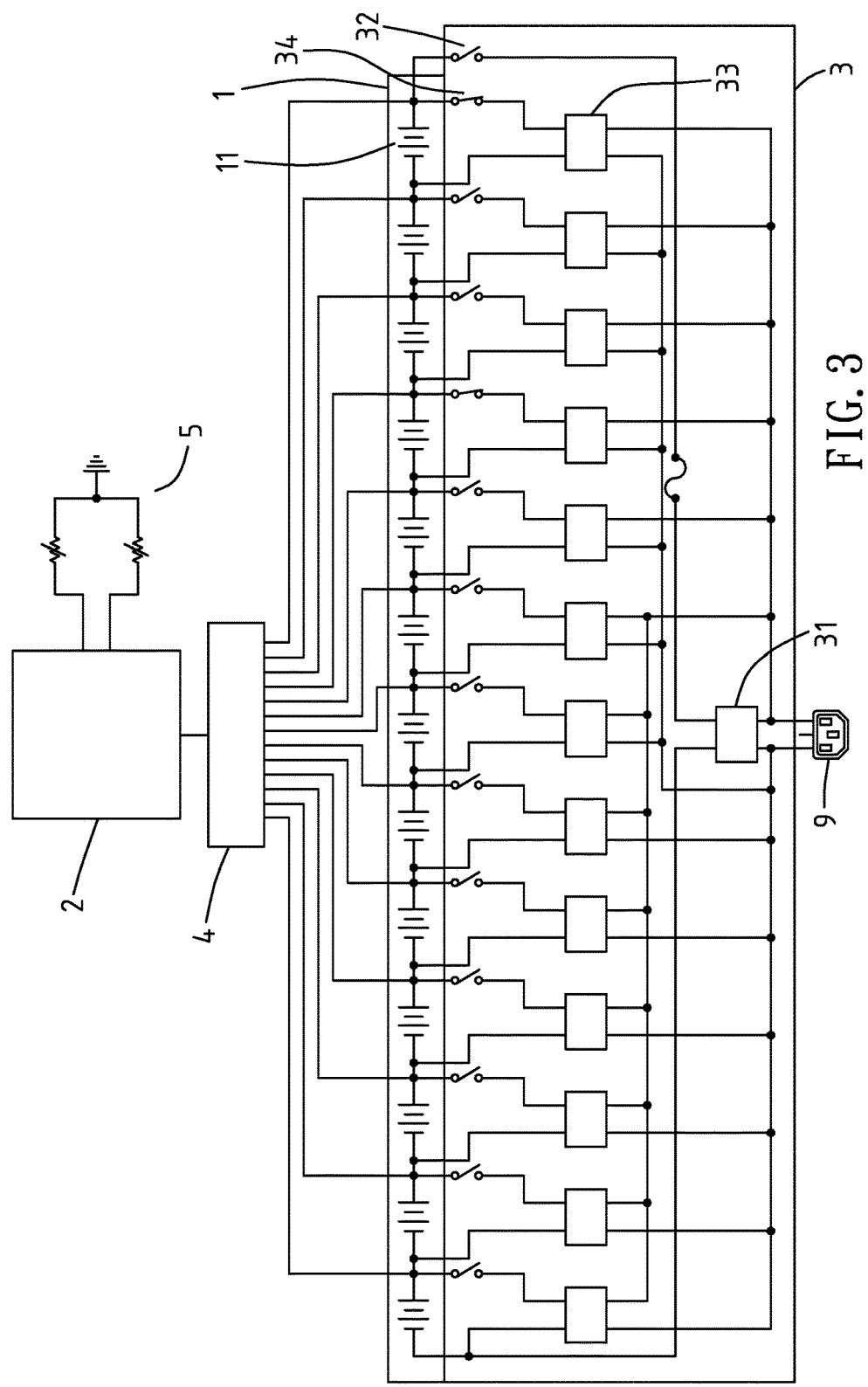
FIG. 3 is a circuit block diagram of the first embodiment of the active equalizing charging device carrying out pre-charging steps according to the present invention.

Pre-equalization charging: As shown in FIG. 3, if the voltage of at least one of the battery modules 11 is below the average voltage value, then the first switch 32 remains in an off-state, thus forming an open circuit between the first battery charger 31 and the storage battery unit 1. And the second switches 34 coupled to the battery modules 11 with a voltage below the average voltage value are activated to form a closed circuit state, with the other second switches 34 remaining in an off-state. Accordingly, the charging unit 3 only charges the battery modules 11 with a voltage below the average voltage value. Pre-equalization charging stops when the voltage of each of the battery modules 11 equals or is above the average voltage value. The aforementioned average voltage value is determined by the internal resistance value of the battery modules 11.

Figure 4:
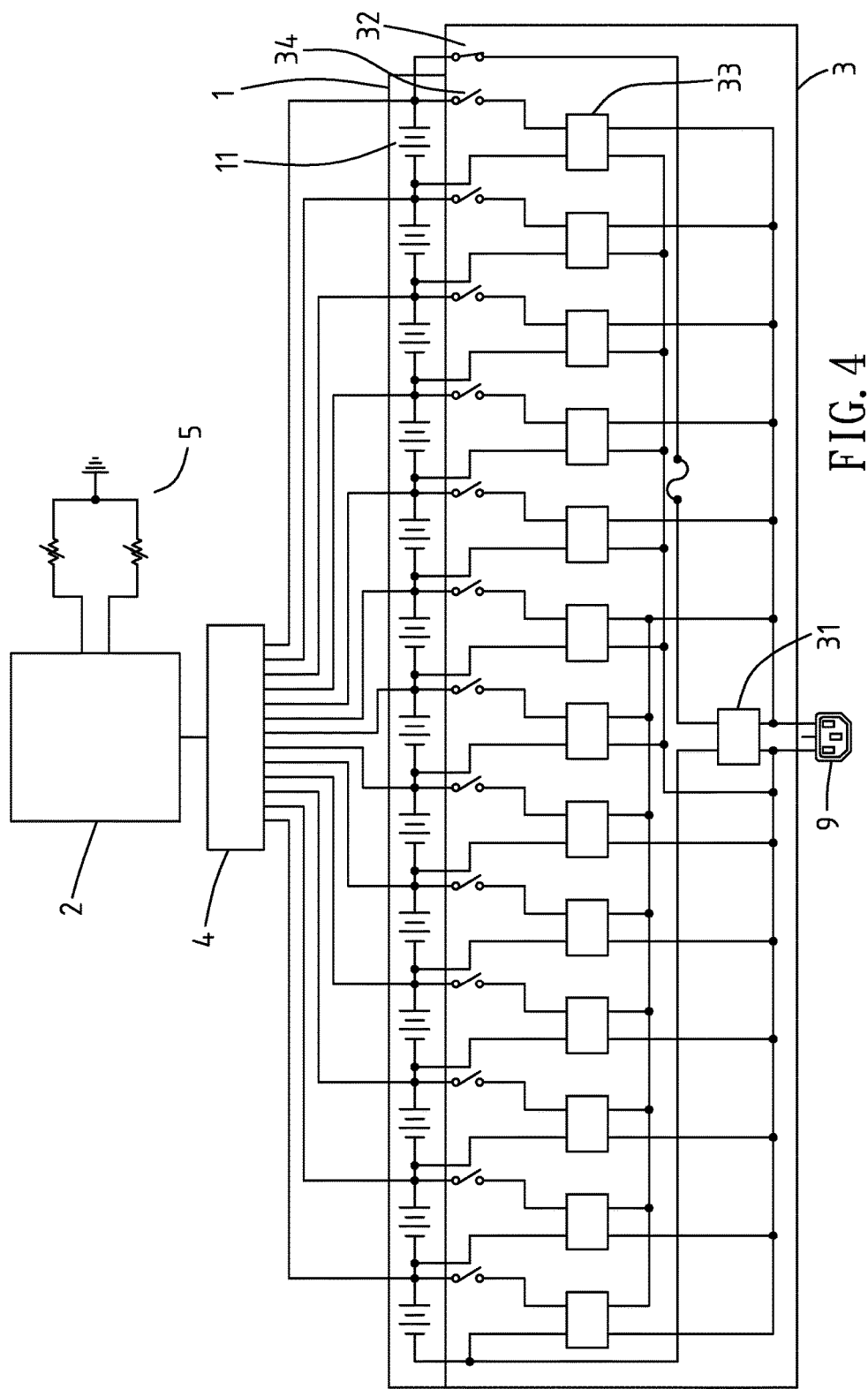
FIG. 4 is a circuit block diagram of the first embodiment of the active equalizing charging device carrying out collective charging steps according to the present invention.

Collective charging: As shown in FIG. 4. if the voltage of each of the battery modules 11 is equal to or is above the average voltage value, then each of the second switches 34 remains in an off-state, and the first switch 32 is activated to form a closed circuit state, thus forming a closed circuit between the first battery charger 31 and the storage battery unit 1, enabling the first battery charger 31 to charge each of the battery modules 11. Collective charging stops when the voltage of at least one the battery modules 11 is equal to the saturation voltage value.

Post-equalization charging: If the voltage of at least one of the battery modules 11 is equal to the saturation voltage value, then the first switch 32 is cut off, and an open circuit between the first battery charger 31 and the storage battery unit 1 is formed; the second switches 34 coupled to the battery modules 11 with a voltage equal to the saturation voltage value are cut off, and the second switches 34 coupled to the battery modules 11 with a voltage below the saturation voltage value are activated to form closed circuit states. Accordingly, the charging unit 3 only charges the battery modules 11 with a voltage below the saturation voltage value. When the voltage of each of the battery modules 11 is equal to the saturation voltage value, then each of the second switches 34 is cut off, thereby completing the charging of the secondary battery.

Excessive heating protection: When the temperature of the storage battery unit 1 is equal to or greater than a preset safe temperature, then the first switch 32 and the second switches 34 all remain in a cut-off state, thus suspending charging of the storage battery unit 1 and preventing damage thereto when charging the secondary battery due to too high temperature.

Only the first battery charger 31 or each of the second battery chargers 33 charges each of the battery modules 11 at the same time.

During the initial stage of charging of a secondary battery, if the voltage of at least one of the battery modules 11 is below the average voltage value, then pre-equalization charging is carried out, thereby protecting the battery modules 11 and preventing reduction in the stored power capacity of one of the battery modules 11 making up the storage battery unit 1.

If the voltage of each of the battery modules 11 is equal to or greater than the average voltage value, then collective charging is carried out, and the first battery charger 31 charges all of the battery modules 11 of the storage battery unit 1, thus enabling rapid charging of each of the battery modules 11. However, with the active equalizing charging device coupled to the secondary battery, when collecting battery information, if the voltage of each of the battery modules 11 is equal to or greater than the average voltage value, then pre-equalization charging is not carried out, directly proceeded with collective charging.

If the voltage of at least one of the battery modules 11 is equal to the saturation voltage value, then post-equalization charging is carried out, and each of the second battery chargers 33 with the relatively low output voltage of V2 is used to respectively continue to charge each of the battery modules 11 not yet fully charged. Accordingly, the charging unit 3 can effectively use the first battery charger 31 and a plurality of the second battery chargers 33 to carry out charging of each of the battery modules 11, equalizing the charging of each of the battery modules 11, and achieving equalization between the time consumed to carry out charging and the capacity of the charging unit 3.

A second embodiment of the active equalizing charging device of the present invention further connects the control unit 2 of the aforementioned first embodiment to a wireless communication unit. The wireless communication unit is used to transmit voltage values and temperature value of the storage battery unit 1 of the secondary battery to a cloud management system of the battery supplier. The cloud management system is able to monitor voltages and temperature of the secondary battery, recording the number of times the secondary battery has been charged, voltage values, and time consumed for each charge, based on which the cloud management system diagnoses whether or not an anomaly has occurred in the secondary battery. When there are anomalies in the voltages and temperature of the secondary battery, the cloud management system is able to notify the user of the secondary battery to proceed with battery maintenance or replacement of the secondary battery. When charging of the secondary battery is complete, the cloud management system can also actively notify the user.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. An active equalizing charging device, used to charge a secondary battery, the secondary battery comprises a storage battery unit, and the storage battery unit comprises a plurality of battery modules connected in series;

the active equalizing charging device comprises a control unit, a charging unit, a voltage detection unit, and a temperature detection unit, wherein the control unit is constructed from an electronic circuit, the control unit is coupled to the charging unit, and the control unit is used to control the charging unit, the voltage detection unit and the control unit are coupled to each of the battery modules, the voltage detection unit is a voltage detection circuit, and the voltage detection unit is used to detect the voltage of each of the battery modules, the temperature detection unit is coupled to the control unit, the temperature detection unit is a temperature detection circuit, and the temperature detection unit is used to detect the temperature of the storage battery unit;

the charging unit comprises one first battery charger, one first switch, a plurality of second battery chargers, and a plurality of second switches, wherein the first battery charger and the storage battery unit are coupled to an external power source, and first battery charger is used to charge each of the battery modules, the first switch and the first battery charger are coupled to the storage battery unit, and the first switch is used to close or open the circuit between the first battery charger and the storage battery unit, the control unit controls the first switch, the number of the second battery chargers and the second switches matches the number of the battery modules, each of the second battery chargers is respectively coupled to one of the battery modules and the power source, and each of the battery modules is respectively coupled to one of the second battery chargers, each of the second switches is respectively coupled to one of the second battery chargers and one of the battery modules, and the second switches are used to close or open the circuit between each of the second battery chargers and the battery modules, the control unit controls each of the second switches; if the charging voltage output of the first battery charger is V1, the charging voltage output of the second battery chargers is V2, and the number of the second battery chargers is n, then V1>n×V2.

2. The active equalizing charging device according to claim 1, wherein the control unit is connected to a wireless communication unit, the wireless communication unit is used to transmit voltages and temperature value of the storage battery unit of the secondary battery to a cloud management system.

3. A method using the active equalizing charging device described in claim 1 to charge a secondary battery, comprising the following steps: collecting battery information: the voltage detection unit detects the voltage of each of the battery modules, the temperature detection unit detects the temperature of the storage battery unit, and the control unit controls the charging unit based on the voltages and temperature information detected by the voltage detection unit and the temperature detection unit;

pre-equalization charging: if the voltage of at least one of the battery modules is below the average voltage value, then the first switch remains in an off-state, and an open circuit between the first battery charger and the storage battery unit is formed, whereupon the second switch coupled to the battery module with the voltage below the average voltage value is activated to form a closed circuit state, and the other second switches remain in an off-state, accordingly, the charging unit only charges the battery module with the voltage below the average voltage value, pre-equalization charging stops when the voltage of each of the battery modules equals or is above the average voltage value; the average voltage value is determined by the internal resistance value of the battery modules;

collective charging: if the voltage of each of the battery module equals or is above the average voltage value, then each of the second switches remains in an off-state, and the first switch is activated to form a closed circuit state, forming a closed circuit between the first battery charger and the storage battery unit, enabling the first battery charger to charge each of the battery modules, collective charging stops when the voltage of at least one the battery modules is equal to the saturation voltage value;

post-equalization charging: if the voltage of at least one of the battery modules is equal to the saturation voltage value, then the first switch is cut off, and an open circuit between the first battery charger and the storage battery unit is formed, whereupon the second switches coupled to the battery modules with a voltage equal to the saturation voltage value are cut off, and the second switches coupled to the battery modules with a voltage below the saturation voltage value are activated to form closed circuit states, accordingly, the charging unit only charges the battery modules with a voltage below the saturation voltage value; when the voltage of each of the battery modules is equal to the saturation voltage value, then each of the second switches is cut off, thereby completing the charging of the secondary battery;

excessive heating protection: when the temperature of the storage battery unit is equal to or greater than a preset safe temperature, then the first switch and the second switches all remain in a cut-off state, thus suspending charging of the storage battery unit;

only the first battery charger or each of the second battery chargers charges each of the battery modules at the same time.

* * * * *